Inventor
A. L. Carroll

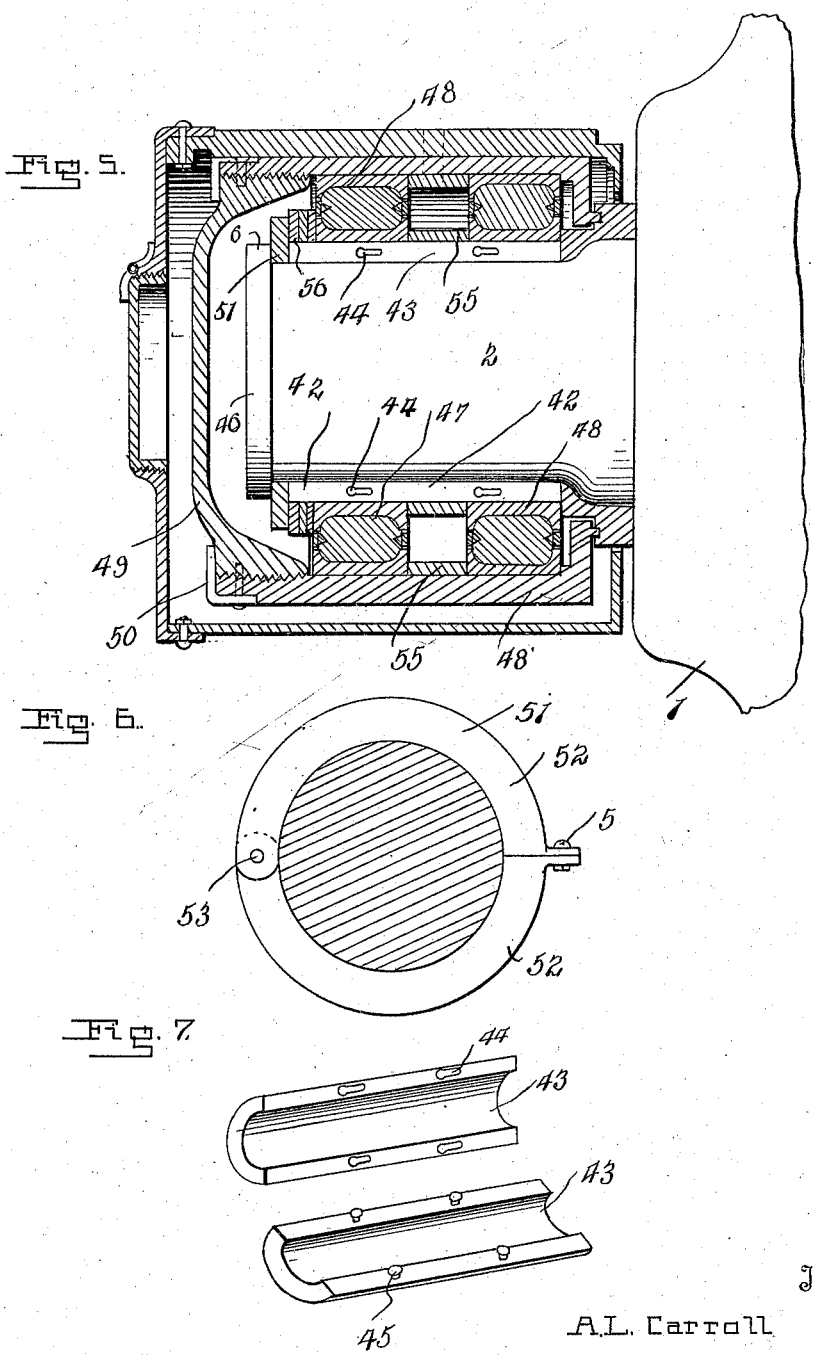

Patented Aug. 6, 1929.

1,723,764

UNITED STATES PATENT OFFICE.

ANDREW L. CARROLL, OF ST. LOUIS, MISSOURI.

AXLE BEARING.

Application filed May 18, 1927. Serial No. 192,371.

The present invention is directed to improvements in axle bearings designed more particularly for use in connection with car wheels, but is not necessarily limited to such use.

The primary object of the invention is to provide a device of this character so constructed that it can be readily assembled or disassembled, and further to provide means whereby the entrance of dust and grit to the bearing is positively prevented.

Another object of the invention is to provide a device of this kind whereby lubricant can be easily supplied thereto and retained therein for a comparatively long period.

In the accompanying drawings:

Figure 3 is a perspective view of one of the journal roller bearings.

Figure 5 is a longitudinal sectional view, showing a modified form of the invention.

Figure 6 is a sectional view on line 6—6 of Figure 5.

Figure 7 is a non-assembled perspective view of the bushing.

Figure 1:
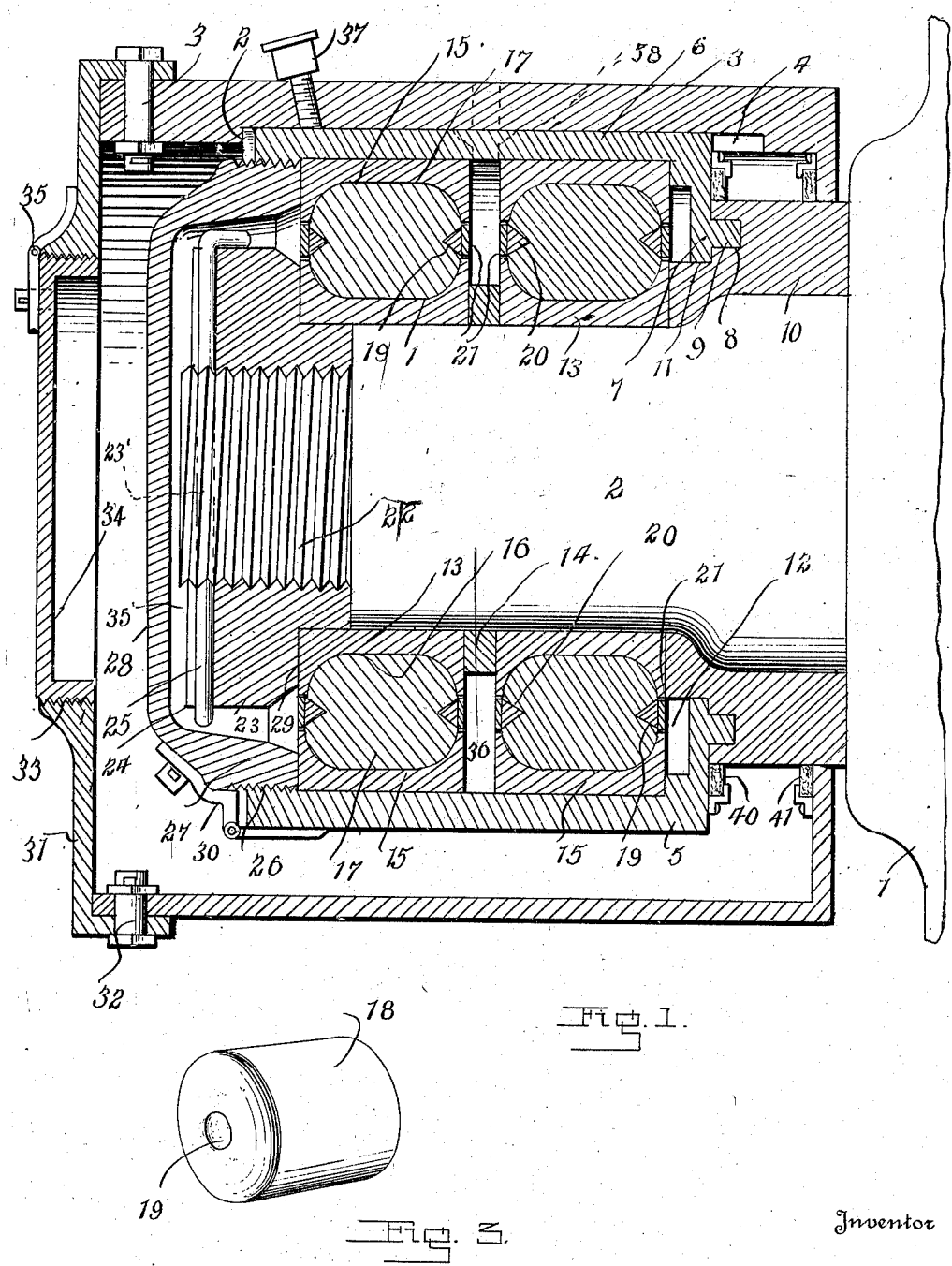
Figure 1 is a longitudinal sectional view through the bearing.
Figure 2:
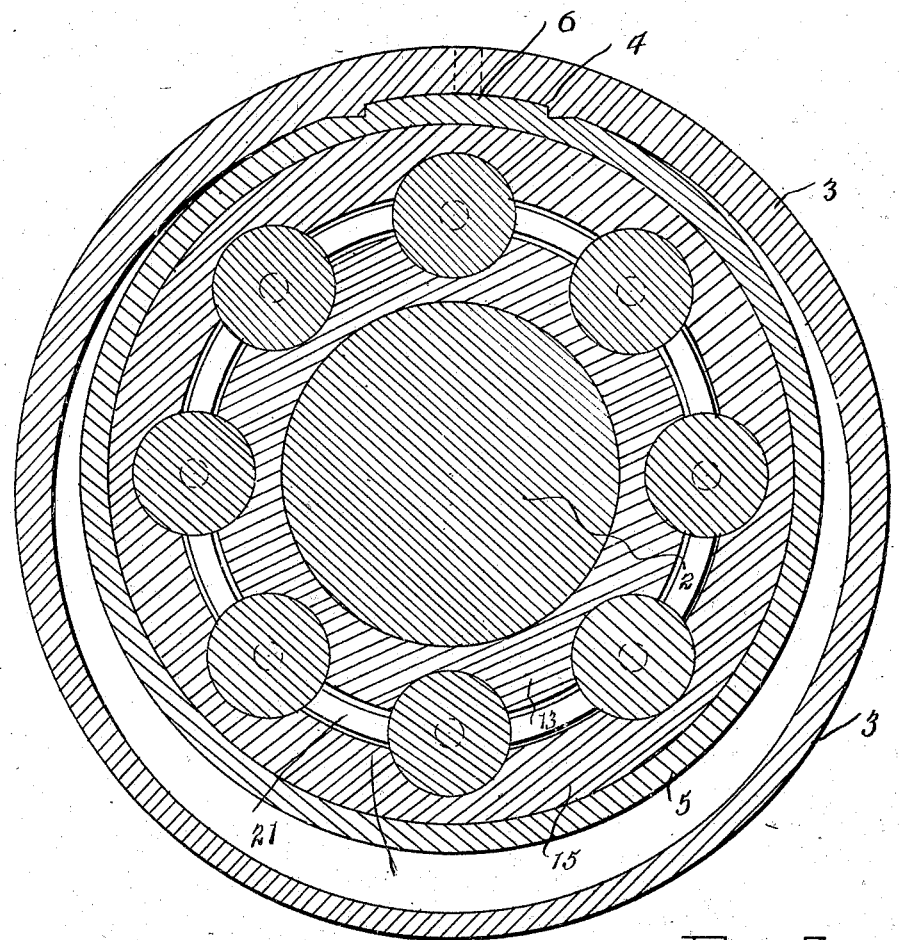
Figure 2 is a vertical, sectional view therethrough.
Figure 4:
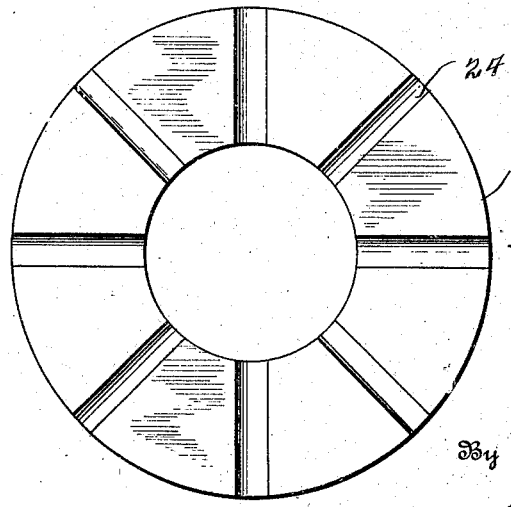
Figure 4 is a front view of the locking nut.

Referring to the drawings, 1 designates a portion of a car wheel, and 2 the axle thereof, said axle being extended into the box 3, said box having a longitudinal groove 4 formed in the under side of its top, the purpose of which will be later explained. A casing 5 is located in the box 3 and has its upper surface formed with a rib 6 adapted to engage the groove 4, said groove being somewhat longer than the rib to permit slight endwise movement thereof in said groove.

The inner end of the casing is formed with an inturned flange 7 provided with a horizontally disposed annular rib 8 adapted to fit in the annular groove 9 provided in the adjacent end of the bushing 10 which encircles the inner end of the axle 2. This bushing is further provided with an annular shoulder 11 upon which the inner periphery of the flange 7 engages, said shoulder being of greater length than the thickness of the flange in order to provide a lubricant chamber 12.

Encircling the axle 2 are race rings 13 maintained in spaced relation by a band 14 and disposed concentrically with respect to the rings 13 are race rings 15. The rings 13 and 15 have their opposed faces provided with annular grooves 16 and 17, respectively, which serve to maintain the roller bearings 18 in place, said bearings having their inner ends provided with recesses 19 and engageable therewith are the bosses 20 carried by the spacing rings 21, said rings serving to hold the roller bearings in proper spaced relation.

The outer end of the axle is formed with a threaded extension 22 upon which is engaged a lock nut 23, said extension having an opening 23' formed therein. The outer face of the nut is formed with radial grooves 24 adapted to register with the opening 23' for reception of the lock pin 25.

The casing 5 is threaded, as at 26, for engagement with the flange 27 of the cap 28. The nut is provided with the shoulder 29 which abuts the outermost race ring 13 to limit the outward movement thereof, the flange 27 abutting the outermost race rings 15 to limit their outward movement.

To prevent accidental disengagement of the cap 28 a latch structure 30 is provided. A cover 31 closes the outer end of the box 3 and is retained therein by a locking member 32, said cover having a central opening 33 and in which is threaded a cap 34 maintained in place by a latch device 35.

The cap 28 is spaced from the nut 23 in order to provide a lubricant chamber 35'. It will be observed that the band 14 maintains the race rings in spaced relation to provide a lubricant chamber 36. An oil cup 37 is carried by the top of the box 3 and from which lubricant is introduced to the groove 4, there being a recess 38 formed in the top of the casing which communicates with the chamber 36, lubricant to the recess being furnished through the opening 39 formed in the box 3.

Felt packing rings 40 and 41 encircle the bushing 10 to prevent leakage of lubricant from the chamber 12 into the box, and the entrance of dust and grit into the box.

From the foregoing description it will be seen that a bearing has been provided which is thoroughly dust proof and one which can be filled with lubricant to assure proper working thereof. Further, by providing the groove 4 and rib 6 the box will be permitted to have slight lateral play in order to relieve the device of sudden strains.

As shown in Figures 5 to 7, inclusive, the axle 2 has engaged thereon a bushing 42 consisting of a pair of sections 43, the side edges of which are provided with key hole slots and lugs 44 and 45, respectively, for interlocking engagement to retain the bushing upon the axle which, in this instance, is provided with an end flange 46.

The bearings 47 and their rings 48 are confined upon the bushing 42 by the casing 48' which has threaded in its forward end a cap 49 maintained against accidental disengagement by a band 50.

To hold the bearings and the bushing in their proper positions, a locking member 51 is provided and consists of a pair of arcuate sections 52, pivotally connected, as at 53. This member encircles the axle 2 and is interposed between the outer end of the bushing 42 and flange 46, the sections being secured in place upon the axle by a bolt 54.

The rings 48 of the bearings are maintained in spaced relation by the bands 55 and interposed between the outermost rings 48 is a plurality of thrust rings 56, preferably three in number, and to relieve friction the intermediate ring may be provided with ball bearings. It will be obvious that similar rings may be interposed between the outer race rings 13 and nut 23 of the preferred form of the invention.

Having thus described the invention, I claim:

1. A device of the class described comprising an axle, race rings encircling the axle, roller bearings associated with the race rings, said race rings being maintained in spaced relation, a casing enclosing the race rings, said axle having a threaded extension, a nut engaged thereon, a cap threaded in the casing and closing the outer end thereof and spaced from the nut, a latch connecting the casing and cap, a bushing encircling the inner end of the axle, the nut and bushing abutting certain of the race rings to maintain the same against longitudinal movement upon the axle, and a box enclosing the casing and slidably interlocked with said casing.

2. A device of the class described comprising an axle, concentrically disposed race rings encircling the axle, roller bearings disposed between the race rings, a bushing encircling the inner end of the axle and having an annular groove therein, a nut threaded upon the outer end of the axle, a casing enclosing the race rings, a cap closing the outer end of the casing and spaced from the nut to provide a lubricant chamber, the casing having a flange spaced from certain of the race rings to provide a lubricant chamber, said flange having an annular rib for engagement in said groove, a band disposed between the race rings to maintain the same in spaced relation to provide a lubricant chamber, a box enclosing the casing and slidably interlocked with the casing, and a cover for the outer end of the box.

3. A device of the class described comprising an axle, race rings encircling the axle, roller bearings associated with the race rings, said axle having a threaded extension provided with a transverse opening, a nut engaged upon the extension and having radial grooves formed therein, a pin engaged in selected grooves and in the opening, a casing encircling the race rings, a cap closing the outer end of the casing and including a flange, said flange confining the pin, said casing having a rib carried thereby, a box having a longitudinal groove therein for slidably receiving the rib, and a cover plate removably engaged in the outer end of the box.

In testimony whereof I affix my signature.

ANDREW L. CARROLL. [L. S.]